INVENTORS
FAY A. NEUSCHWANGER
JULIAN B. MILLER, JR.

BY William E. Recktenwald
ATTORNEY

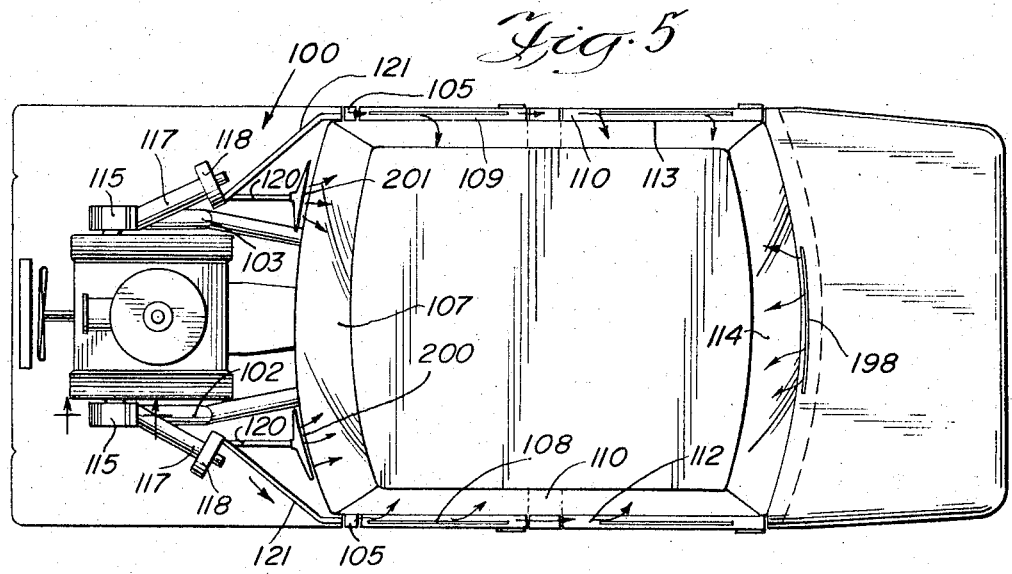
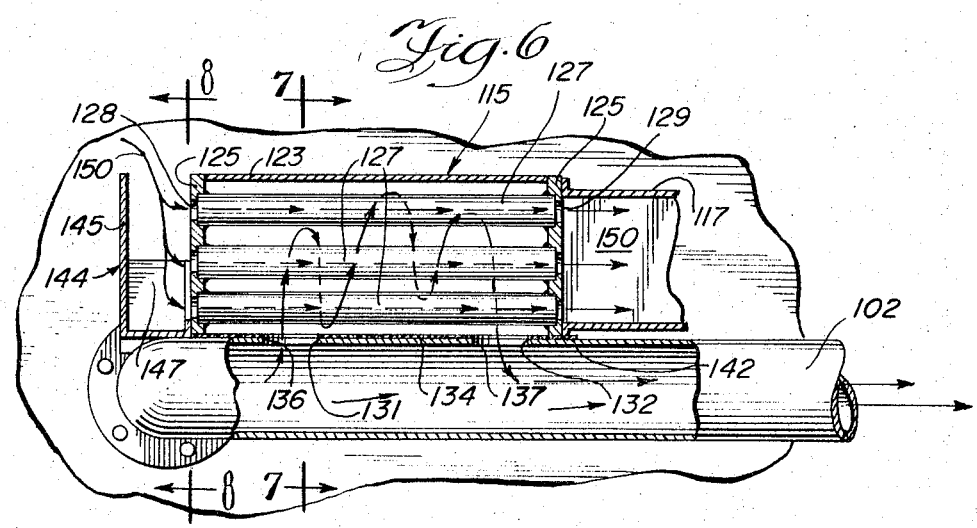
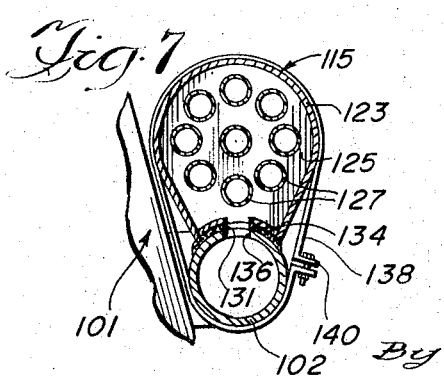
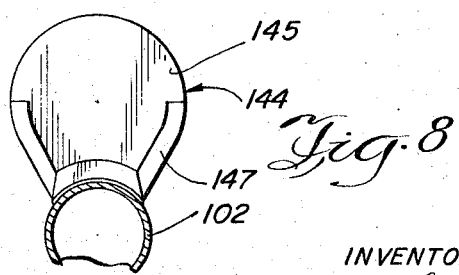
INVENTORS.
Fay A. Neuschwanger
Julian B. Miller Jr
ATTORNEY Jan. 30, 1968  F. A. NEUSCHWANGER ETAL  3,366,336
COMBINATION WINDSHIELD HEATER-DEFROSTER
AND WASHING SYSTEM
Filed March 23, 1965  3 Sheets-Sheet 3
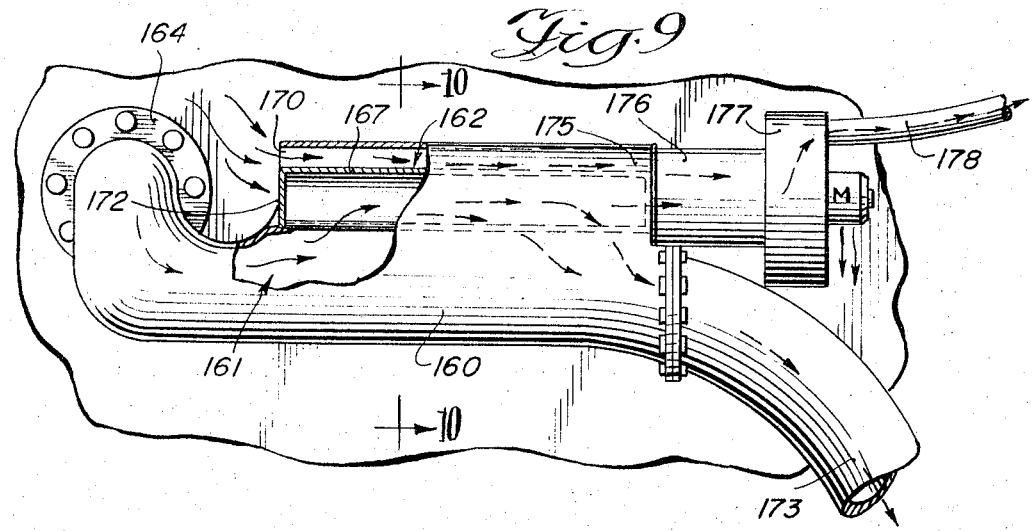
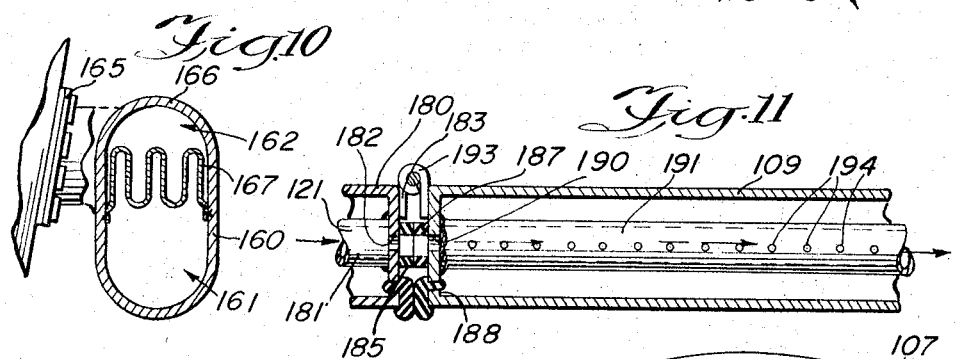
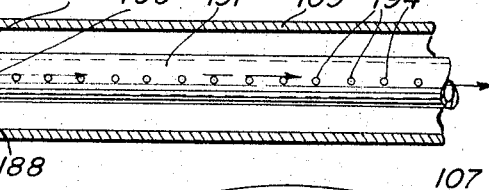
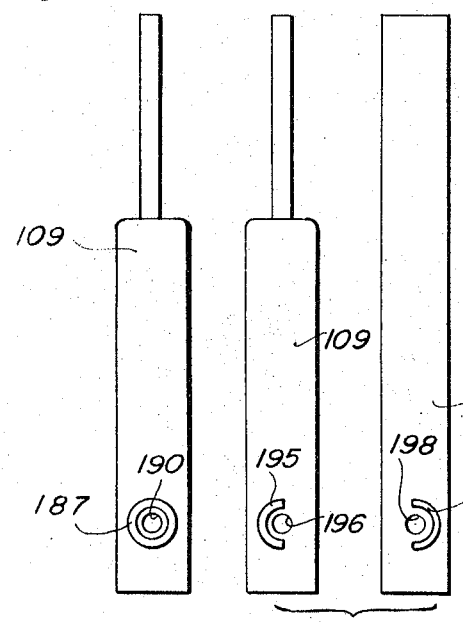
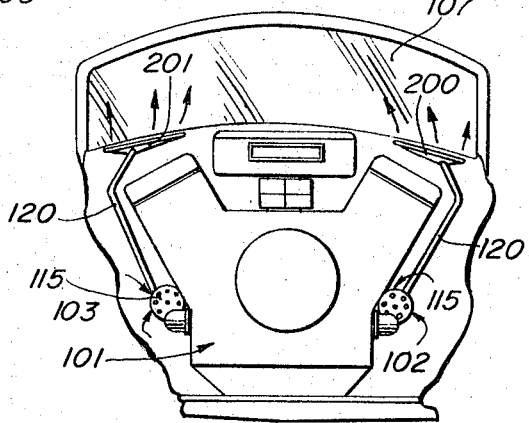
INVENTORS
Jay A. Neuschwanger
Julian B. Miller Jr
BY
ATTORNEY

United States Patent Office 3,366,336
Patented Jan. 30, 1968

3,366,336
COMBINATION WINDSHIELD HEATER-
DEFROSTER AND WASHING SYSTEM
Fay A. Neuschwanger, 1811 Broadway, Chesterton, Ind.
46304, and Julian B. Miller, Jr., R.R. 5, Long Lake,
Valparaiso, Ind. 46383
Continuation-in-part of application Ser. No. 317,410,
Oct. 21, 1963. This application Mar. 23, 1965, Ser.
No. 442,148
4 Claims. (Cl. 239—129)

The present application is a continuation-in-part of our copending application, Ser. No. 317,410 filed Oct. 21, 1963, and now abandoned.

This invention relates to an automotive device and more specifically to a novel arrangement either for keeping all of the windows and the windshield of a vehicle clear of ice, frost and snow or for clearing said windows and windshield of ice, frost and snow once it is formed thereon.

Heretofore, motor vehicles have been equipped with windshield wiper blades on the outside of the windshield and with hot air defrosters on the inside of the windshield. As long as the rain, ice, sleet, snow or the like hitting the windshield is soft and the wiper blades are pliable and moving, the outside of the windshield can be kept clear. The hot air type defroster, within limited areas, can reduce the accumulation of frost and ice on the inside of the windshield. Sometimes the defroster heat is enough to help soften the ice accumulation on the outside of the windshield so that the blades can move it out of the line of vision.

However, all of the enumerated solutions to the problems vanish when the vehicle is travelling at ordinary highway speed or when the wiper blades become clogged with ice and snow or are too stiff from the cold to wipe effectively. In addition, on cold days it is possible without precipitation to have mud and salt thrown on the windshield requiring fluid to clear it, but the washer fluid is either frozen in the nozzle or freezes when it hits the windshield so that the blade cannot wipe the glass. Under all these conditions the windshield becomes opaque and the hazards to the vehicle and its occupant become very great.

In addition, the inside and outside of the vehicle's side and rear windows also become coated with ice, snow or frost and particularly on cold days when the vehicle is closed and one or more people are in the vehicle breathing moisture into the air. The moisture condenses and freezes on the glass surfaces. Snow and ice often form on the windows which at present can be cleared only by scraping.

It is a principal object of this invention to overcome the above noted disadvantages of the existing window and windshield clearing systems and to provide an improved system whereby under practically all operating conditions of a vehicle the windows and windshield will be kept clear and clean.

It is another object of this invention to provide a vehicle with an improved window and windshield clearing system whereby the wiper blades are kept soft and pliable even under extremely cold operating conditions.

It is still another object of this invention to provide a vehicle with an improved windshield clearing system whereby the windshield washer solution is kept in a fluid condition ready for instant and effective use.

It is a further object of this invention to provide a system whereby heated air is flooded over the outside of the windows and the windshield to keep the glass effectively warm for preventing accumulations of ice, snow or the like.

It is still a further object of this invention to provide a system that can be readily attached to a vehicle either at the factory or in the field without the need for complicated tools, fittings, modifications or equipment.

It is an object of this invention to provide a system that is relatively inexpensive to build, simple to install and yet is highly effective and efficient in use.

And a further object of this invention is to provide a device whereby almost instant heat is available upon starting the vehicle engine so that a window or windshield with heavy frozen-on accumulations of ice and snow can be cleared within a few minutes after the heated air starts to flow over said window or windshield.

These and other objects and advantages of the invention will be apparent from the following specification when taken with the accompanying drawings, in which:

FIGURE 5 is a top view of a motor vehicle showing an improved modification of our invention in operative position thereon;

FIGURE 6 is a cross-sectional view through our improved heat-exchanger taken on the line 6—6 of FIGURE 5 with parts of the muffler broken away and in section;

FIGURE 7 is a cross-sectional view taken on the line 7—7 of FIGURE 5;

FIGURE 8 is a cross-sectional view taken on the line 8—8 of FIGURE 5;

FIGURE 9 is a further modification of the heat-exchanger of our invention;

FIGURE 10 is a cross-sectional view taken on the line 10—10 of FIGURE 9;

FIGURE 11 is a sectional view taken through the hinge portion and part of the door of a motor vehicle looking down on the coupling of the duct work between the frame and the door of a vehicle;

FIGURE 12 is an end view of a door showing one type of rubber seal for the duct work;

FIGURE 13 is a modified end view of a door and matching frame showing the coacting parts that form a coupling for the duct work of our invention; and FIGURE 14 is a schematic front view of an engine and windshield of a vehicle showing the relative positions of the heat-exchanger and duct work to the windshield.

Figure 1:
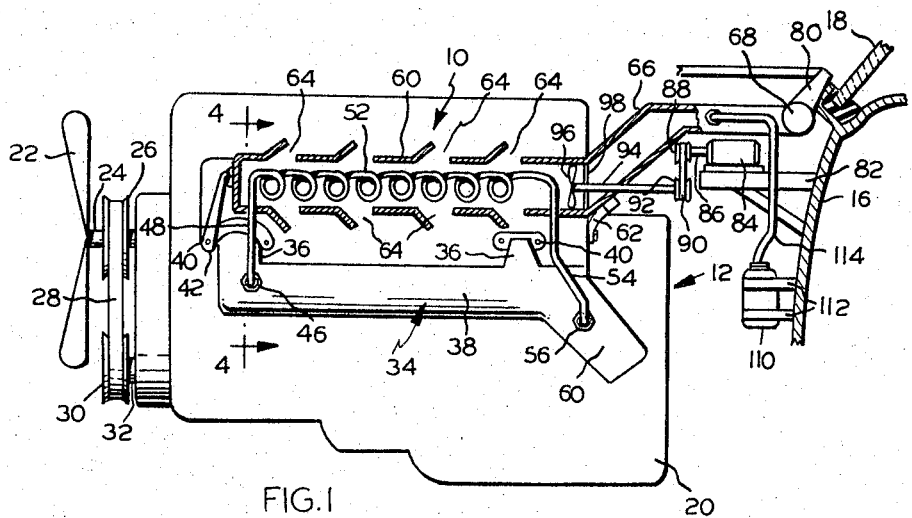
FIGURE 1 is a side elevational view of an internal combustion engine in position in a motor vehicle showing our invention in operating position.
Figure 2:
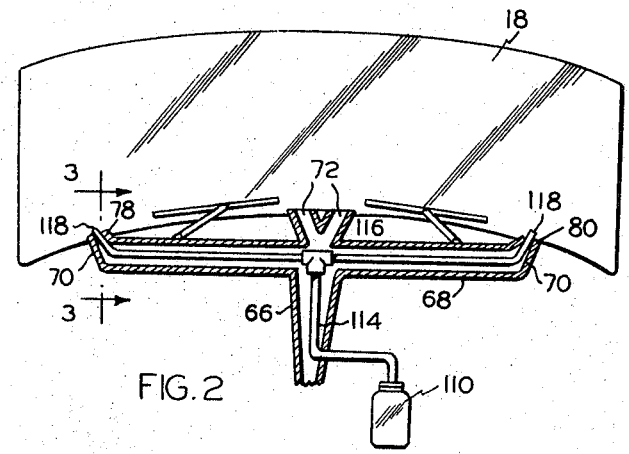
FIGURE 2 is a cross-sectional view taken on the line 2—2 of FIGURE 1.
Figure 3:
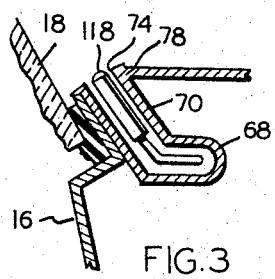
FIGURE 3 is a cross-sectional view taken on the line 3—3 of FIGURE 2.
Figure 4:
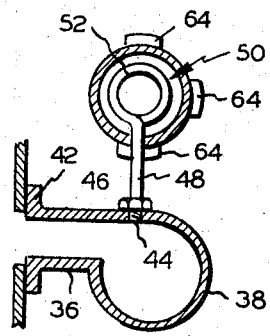
FIGURE 4 is a cross-sectional view taken on the line 4—4 of FIGURE 1.

Referring to FIGURES 1-4 of the drawings wherein the same reference numeral refers to the same part throughout the several views, an internal combustion engine 10 is mounted in an engine compartment 12 of a motor vehicle having a fire wall 16 and a windshield 18 upwardly projecting therefrom.

The engine 10 comprises an engine block 20 having a fan blade 22 mounted on a shaft 24 carrying a pulley 26 engaged by a belt 28 for connection with a second pulley 30 mounted on a shaft 32. The engine 10, only one side of which is shown, is indicated as being a V-type. The side of the engine not shown is identical with what is shown and is conventional. Our improved apparatus is described as being mounted in the engine compartment for attachment to one side, the other side, or both sides of the engine without deviating or digressing from the scope of the invention.

Extending along the sides of the engine 10 is a manifold housing 34 having integrally formed connecting pipes 36 extending from the body 38 of said manifold 34 and being connected to the engine block 20 by lugs 40 passing through apertures formed in flanges 42 at the base of each pipe 36. Tapped into a fore part of the manifold body 38 is a threaded aperture 44 into which is screwed a fitting 46 for connecting one end 48 of a tube 50 onto the manifold 34. The tube 50 is hollow and extends away from the fastened end 48 for a short distance and is then formed into a coiled portion 52 which ends with another short portion on the other end 54. The end 54 of the tube 50 extends into a fitting 56 which is screwed into a tapped aperture 59 in the rear end portion 60 of the exhaust manifold 34.

The coiled portion 52 of the tube 50 extends substantially the length of the manifold body 38 and is encased in a louvered housing 60 throughout its length. The housing 60 is supported on the engine by brackets 62 at each end thereof and has one or more rows of rearwardly opening louvers 64 along substantially the full length thereof. In the illustrated embodiment there are three rows of louvers 64, but it is to be understood that any reasonable number or size of louvers down the sides of the housing 60 is within the context of this invention. At the rear portion of the housing 60 is attached a sheet metal piece of piping 66 which is shaped to angle around portions of the engine 10 and is connected to an elongated piece of piping 68 running substantially parallel to the base of the windshield 18 under the hood or under the cowling of the vehicle. The piping 68 has an upwardly formed tubular outlet 70 at each end thereof and a forked pair of tubular outlets 72 at the center portion thereof. The outlets 70 and 72 taper to relatively flat elongated slits 74, 76, respectively, at the outward ends 78, 80 thereof. The ends 78, 80 extend up through the cowl or just under the trim strip at the belt line of the windshield so that the slits 74, 76 are pointed toward the base portion of the windshield in close proximity thereto.

Mounted on a bracket 82 carried by the firewall 16 is an electrically driven motor 84 which has a shaft 86 driving a pulley 88, a belt 90, another pulley 92, a shaft 94 and a suction fan 96 in the rear end of the housing 60. The shaft 94 extends through the wall of the piping 66 and is supported for rotation in the housing 60 by a spider bracket 98 carried by said housing 60. The blades of the fan 96 are constructed so as to pull air through the housing 60 past the coils 52 of the tube 50 and forces it through the piping 66 and 68 and out through the slits 74, 76 of the outlets 70 and 72 onto the windshield 18. The relative sizes of pulleys 88 and 92 can be varied so as to effectively increase or decrease the r.p.m. of the fan 96. It is possible to connect the motor shaft 86 directly to the fan 96 if it is so desired.

With our device as described so far it will be apparent that hot exhaust gases in the manifold 34 will pass into the tube 50 through its coiled portion 52 and back into the manifold 34 for ready ejection from the exhaust system of the vehicle in the usual manner. As the gases pass through the coiled portion 52 in the housing 60 they will heat the tube 50 so that air sucked into the housing by the fan through the louvers will be heated thereby. Said heated air will be forced through the piping and out onto the windshield to heat said windshield from the outside. The heated air flooding over the windshield will not only heat the windshield to help prevent the formation of ice and frost, but will also serve to heat the rubber portion of the wiper blades to thereby keep the blades pliable and flexible for wiping any moisture from the windshield. The heating of the wiper blades prevents the formation of ice within the metal linkages of the blades so as to make it possible for the blades to function properly. The heating of the outer surface of the windshield will help prevent condensation and frost from forming on the inside of the windshield thereby further promoting safety on the highway.

In the event it is desirable to double the amount of heated air available for flooding onto the windshield, it is well within the context of our invention to have a tube 50 and louvered housing 60 on each side of the engine with a Y-type piping at the rear end of the engine. The piping will then connect to the piping 68 and will function in the same manner as just described. Where the taps are made into the manifold 34, and how many taps are used, is an individual choice of the car owner. The form shown in the drawings is for illustration purposes only and the invention is not to be construed as limited to that form.

An additional feature of our invention is the inclusion of the windshield washer apparatus within the heat ducts of our system. Specifically, a windshield washer bottle and actuation mechanism 110 is mounted on the firewall 16 by brackets 112. The washer is actuated in a conventional manner within the vehicle by pressing a button, turning a switch or pushing a pedal, all as is well known in the art. Extending from the washer bottle is a rubber tube 114 which extends to and passes through a sealed opening in the piping 66. The tube 114 extends within the piping 66 to a T joint connection 116 in the piping 68 and continues out each end of the head of the T to the outlets 70 and slits 74. The ends of the tube 114 in the slits 74 are formed into or are connected to spray nozzles 118 projecting toward the surface of the windshield. From this construction it becomes obvious that the windshield washer fluid in the bottle 110 can be pumped through the heated piping 66 and 68 and ejected upon the windshield at the same time the flood of warm air is flowing from the slits 74, 76 whereupon the washer fluid can be wiped by the blades over the surface of the heated windshield to clear away the mud, muck, scum or other obstruction deposited upon the windshield as the vehicle is driven along the highways in winter.

The heated air and heated washer fluid singly, or together, combine to make it possible to keep a windshield clear and clean under the worst possible driving conditions. No amount of snow, sleet, road dirt or film at any reasonable speeds will require a driver equipped with our improved apparatus to stop due to obstructed vision. The heated air and/or washer fluid on the windshield while driving under all extremes of winter weather conditions will keep the windshield clear for safe driving.

The modification shown in FIGURES 5–8 provides for a vehicle 100 having an engine 101 with manifolds 102, 103 on opposite sides thereof. The engine shown is of the V-8 variety, it being understood that straight-line engines with only one manifold can be used without departing from our invention. A body 106 on the vehicle has a windshield 107, a pair of front roof support posts 105, front doors 108, 109, a center column 110, a pair of rear doors 112, 113 and a rear window 114.

A heat exchanger 115 is mounted on each muffler 102, 103 and has duct work 117 going into blowers 118 with ducts 120, 121 extending respectively to the base of the windshield 107 and to a series of ducts around the body work of the vehicle. The duct work around the vehicle will be described in detail hereinafter.

The heat exchanger 115 is composed of an outer generally cylindrical shell or housing 123 connected at the front with a plate 124 and at the rear with a plate 125. A plurality of hollow tubes 127 extend in sealing relation between the front plate 124 and rear plate 125 in alignment with apertures 128, 129, respectively, in said plates 124, 125. The housing 123 has a pair of slots 131, 132 axially aligned with each other in the arcuately shaped bottom wall 134 of said housing. The heat exchanger 115 is adapted to have said arcuate bottom wall 134 seat on the top surface of the manifolds 102, 103 with the slots 131, 132 aligned with mating slots 136, 137 formed in said manifolds. A pair of fastening means 138 such as straps are wrapped around the manifold and the housing 123 of the heat exchanger 115 and are bolted or joined together as at 140 to secure the heat exchanger on said manifold. A gasket 142 of heat resistant material, having apertures aligned with the slots 131, 136 and 139, 137, can be inserted between said heat exchanger and manifold to seal the joint against leaking exhaust gases.

If desired a baffle 144 can be secured to the front of the exchanger 115 and comprises a plate 145 spaced from said front 124 by means of the shaped support 147 extending from the plate 145 to the housing 123. The plate of the baffle is in direct baffling relation to the wind currents attempting to enter the openings 128 in the front of the housing, so that air entering the heat exchange tubes is mostly drawn in in a fashion to be described hereinafter.

With our modified heat exchanger 115 just described in position on a manifold, the hot exhaust gases from the engine enter the manifold and blow up through the slots 136, 131 into the housing 123 of the exchanger and pass around, over and between the tubes 127 and back out through the slots 132, 137 into the exhaust manifold 102 and out the vehicle exhaust. Air passing through the vehicle radiator and into the engine compartment of the vehicle is pulled over the baffle 145 and into and through the tubes 127 in the exchanger. Air designated 150 is heated by the heat extracted from the hot exhaust gases in the housing 123 and passes out into the duct 117 to the blower 118 and on to the windshield or around the vehicle body as will be described hereinafter. The blower 118 pulls the air around the baffle 145, through the tubes 127 and out onto the windshield and onto the windows to heat the same.

FIGURES 9 and 10 show a still further modified form of our invention wherein a manifold 160 is cast specially to include a regular exhaust gas part 161 and a heat exchange part 162. The manifold 160 is connected at 164 and 165 to the side of the engine in the usual fashion. Cast integrally with the manifold and on its inside is the corrugated wall 167 having laterally spaced convolutions (see FIG. 10) which separates the exhaust gases entering the manifold through the parts 164, 165 from the heat exchange side 162. As much surface area as is possible is provided by the corrugations between the exhaust side and the heated air side so as to maximize the extraction of heat from the exhaust gases to raise the air temperature a maximum amount. It will be obvious that the outer shell on body 166 of the manifold 160 could be moulded as one piece with the corrugated wall 167 being an insert in the mould. As can be seen in FIG. 9, the exhaust part 161 of the manifold bends down from the parts 164, 165 in such a way that the entrances 170 to the air passages in the heat exchange part 162 are partially baffled against the direct entrance of air into the passages. On the front of the heat exchange part 162 a wall 172 is formed to seal the exhaust gases in the manifold and yet permit air to be drawn into the opening 170 at the front of the heat exchanger 162. The air to be heated enters the opening 170 in the heat exchange part and passes over the heated wall 167 to pick up heat therefrom.

The exhaust gases after passing through the exhaust part 161 of the manifold go out through the exhaust pipe 173 to a regular muffler and a tail pipe, not shown.

The rear portion 175 of the heat exchange part 162 is connected by a duct 176 to a blower 177. The output of the blower 177 is connected to a duct 178 which extends to the base of the windshield.

In this embodiment, the blower 177 draws air into the opening 170 and over the heated corrugated wall 167 soaking up heat along the way. The heated air is then forced on toward the surfaces to be heated as will be described hereinafter. The exhaust gases from the engine, after giving up heat to the corrugated wall 167 and air in the heat exchanger, pass on out through the tail pipe.

The heat exchangers 115 and 162 of the FIGURES 5-10 embodiments are highly efficient, high volume units capable of extracting relatively large amounts of heat from the exhaust gases as they are discharged into the manifold from the engine.

Referring now to FIGURES 5, 11, 12 and 13, it can be seen that duct work 121 extends from the blowers 118 to the front posts 105 of the vehicle wherein the passageway 181 of the duct aligns with an aperture 182 in the hinge face 183 of the post 105. The end of the duct 121 is welded or the like to the post as shown in FIG. 11. A rubber washer 185 is cemented to the edge 183 around the aperture 182, which is adapted to sealingly engage with a washer 187 cemented in mating alignment to the edge 188 of the door 109. An aperture 190 communicates with the washer 187 and with a tube 191 welded in the door 109. The door 109 is hinged at 193 to the post 105 to permit opening of the door in the usual fashion. The tube or duct 191 is shown as having openings 194 through its top surface so that hot air from the heat exchanger will be forced out and up over the operating parts of the door and window to defrost the same and keep the window clear. It is believed to be obvious that the duct 191 could be located near the top of the metal part of the door cavity on either the inside, outside or both sides of the glass so as to blow hot air onto the inside, outside or both sides of the glass, as desired.

The duct work 191 continues to the other edge of the door 109 wherein a one half rubber washer 195, FIGURE 13, is secured to the door concentrically half way around the opening 196 communicating with the duct 191. A post 110 between doors 109 and 113 has a mating one half rubber washer 197 surrounding an opening 198 communicating with the continuing duct work around the vehicle. As the door 109 is pulled shut, the one half washer 195 will engage with its mating one half washer 197 to effect a seal between the door and the duct in the post 110. The seals and duct work will be repeated between each door and post so that the duct work will continue around each side of the vehicle and up to the rear window 114 of the vehicle. The ducts from both sides will terminate in a slot 198 adjacent the rear window 114. The slot 198 can be on the inside, outside or both sides of the rear window and can be connected respectively with the ducts of one side, the other side or both sides.

From the above, it will be seen that we provide a device wherein a highly efficient, high volume heat exchanger (162, 115, 50) is connected to duct work which projects hot air through openings 200, 201 (72, 74, 76) onto the outside of the windshield and also through duct work around the inside of the body of the vehicle and through the doors whereby the hot air is blown over the side windows and rear windows of the vehicle. In this way any ice or frost is removed from the surfaces of the glass and new accumulations of ice, frost or steam on said glass surfaces are prevented. The hot air projected onto the windshield also serves to keep the wiper blades pliable and free to clear windshield.

The description of FIGURES 1-4 with respect to installing the windshield washer system in the duct work to the windshield so as to prevent freezing of the fluid and blocking of the duct work is carried over into FIGURES 5-14. That is the modifications of FIGURES 5-14 include the piping and nozzles of FIGURES 1-4. However, the piping and nozzles have not been illustrated and described in FIGURES 5-14 so as to keep the showings as uncluttered as possible.

FIGURE 14 shows a front view of the engine 101 and the windshield 107 with the heat exchanger 115 mounted on the manifolds 102, 103. The heated air from the heat exchange 115 is shown piped to the nozzles 200, 201 for projection onto the surface of the windshield.

It is contemplated that the apparatus described will be installed at the factory when the automobiles are being manufactured. However, to provide vehicles already on the road with this apparatus it is contemplated that the apparatus will be supplied as a kit which will include in the case of embodiment of FIGURES 1-4, the coiled tubing, a drill and tap for the manifold openings, the housing and piping, motor, fan and bracket. In the embodiment of FIGURES 5-8, the heat exchangers 115, straps, ducts, motors, fans and taps for the holes in the manifold will be supplied in a kit, while the embodiment of FIGURES 9–10 will be supplied as a replacement manifold, ducts, fans and motors. A universal set of instructions for installations on all makes and models of automobiles will be supplied to make it possible to readily install the apparatus for quick and efficient operation.

It is thus readily seen that we have provided an improved apparatus adapted for use with motor vehicles which provides an efficient system for keeping a windshield clear of ice, snow, sleet, mud and other obstructions to vision, particularly in winter weather conditions.

It will, of course, be understood that various changes may be made in the form, details, arrangements and proportions of the parts, without departing from the scope of the invention, which, generally stated, consists of a device capable of carrying out the objective above set forth, in the parts and combinations of parts disclosed and defined in the appended claims.

What is claimed is:

1. In a windshield clearing device comprising in combination means connected into a manifold for passing heated exhaust gases therethrough, a louvered housing surrounding the major portion of said means, piping connected with said housing extending to a plurality of outlets at the base of a windshield, fan means for moving air through said housing and past said first named means whereby the temperature of said air is raised, said fan means forcing said heated air through said outlets onto the windshield, flexible tube means connected with a windshield washer bottle, said tube means extending into said piping and passing within said piping to spray nozzles projecting from said outlets of said piping, and means for forcing fluid through said flexible tube means and spraying from said nozzles onto the windshield surface whereby said windshield can be kept clear of snow, ice and other obstructions to vision.

2. A windshield clearing device comprising conduit means connected into the front and rear portions of a manifold for passing heated exhaust gases therethrough, a louvered housing carried by an engine and surrounding a major portion of said conduit means, duct work connected with said housing and extending to a plurality of outlets at the outside base of a windshield, fan means for moving air through said housing and past said conduit means whereby the temperature of said air is raised, said fan means forcing said heated air through said outlets onto the windshield, a windshield washer system carried by said engine, tube means for moving fluid from a reservoir onto the windshield surface and extending into said duct work to spray nozzles projecting from said outlets of said duct work, and means for forcing washer fluid through said means for spraying from said nozzles onto the windshield surface.

3. In a windshield clearing device comprising in combination means connected onto a manifold for passing heated exhaust gases therethrough, means for extracting heat from said first named means and transmitting said heat to piping connected with a plurality of outlets at the base of a windshield, fan means for moving air past said first named means whereby the temperature of said air is raised, said fan means forcing said heated air through said outlets onto the windshield, flexible tube means connected with a windshield washer bottle, said tube means passing within said piping and receiving heat from said heated air, said tube means being connected to spray nozzles projecting from said outlets of said piping, and pump means for forcing washer fluid through said heated flexible tube means whereby said fluid can be sprayed from said nozzles onto the windshield surface.

4. A windshield clearing device for a vehicle having an internal combustion engine with an exhaust system comprising heat exchange means having a housing, a corrugated heat transfer wall having laterally spaced convolutions on the inside of said housing dividing said housing into at least two chambers, one of said chambers being connected with said engine exhaust system, the other of said chambers being open at one end to the atmosphere, conduit means connected to the other end of said other of said chambers and extending to outlet means adjacent a vehicle windshield for conducting air heated in said heat exchange means to the outside of said windshield, fan means positioned in said conduit means for drawing said heated air from said other chamber of the heat exchange means through said conduit means and unto said windshield, a windshield washer system associated with said vehicle, tube means for conducting washer fluid from a reservoir into and through a portion of said conduit means to discharge nozzles adjacent the base of said windshield and within the confines of said conduit outlet means, and means for forcing washer fluid through said tube means for discharging said fluid from said nozzles onto the windshield surface.

References Cited

UNITED STATES PATENTS

| | | | |
|---|---|---|---|
| 1,790,419 | 1/1931 | Heinemann et al. | 239—284 |
| 1,827,998 | 10/1931 | Otwell | 237—12.3 |
| 1,853,585 | 4/1932 | Sutter | 165—51 |
| 2,087,617 | 7/1937 | Francisco | 165—139 |
| 2,240,013 | 4/1941 | Gale | 239—284 |
| 2,260,904 | 10/1941 | Horton | 239—284 |
| 2,719,339 | 10/1955 | Clem | 239—284 |
| 2,835,533 | 5/1958 | Baker | 239—129 |
| 2,594,437 | 4/1952 | Horton | 239—284 |

M. HENSON WOOD, JR., *Primary Examiner.*

R. S. STROBEL, VAN C. WILKS,

*Assistant Examiners.*